(12) United States Patent
Miyazaki

(10) Patent No.: US 10,539,852 B2
(45) Date of Patent: Jan. 21, 2020

(54) ELECTROCHROMIC ELEMENT, OPTICAL FILTER, LENS UNIT, IMAGING DEVICE, AND WINDOW COMPONENT

(71) Applicant: CANON KABUSHIKI KAISHA, Tokyo (JP)

(72) Inventor: Kazuya Miyazaki, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 15/479,062

(22) Filed: Apr. 4, 2017

(65) Prior Publication Data

US 2017/0293193 A1    Oct. 12, 2017

(30) Foreign Application Priority Data

Apr. 7, 2016  (JP) .................................. 2016-077423

(51) Int. Cl.
*G02F 1/153* (2006.01)
*G02F 1/1516* (2019.01)
*C08B 37/00* (2006.01)

(52) U.S. Cl.
CPC .......... *G02F 1/153* (2013.01); *C08B 37/0018* (2013.01); *G02F 1/15165* (2019.01); *G02F 2203/48* (2013.01)

(58) Field of Classification Search
CPC .... G02F 1/153; G02F 1/15; G02F 2001/1515; G03B 7/00; G03B 11/00; G03B 7/003
See application file for complete search history.

(56) References Cited

U.S. PATENT DOCUMENTS

| 4,902,108 A | 2/1990 | Byker |
| 5,777,038 A * | 7/1998 | Nishikawa ............ C08F 265/04 525/295 |
| 5,955,539 A * | 9/1999 | Nishikawa ............ C08F 279/02 525/63 |
| 2014/0168746 A1* | 6/2014 | Yamamoto ............... G02B 5/23 359/275 |

FOREIGN PATENT DOCUMENTS

JP    2000-075326 A    3/2000

* cited by examiner

*Primary Examiner* — Darryl J Collins
*Assistant Examiner* — Journey F Sumlar
(74) *Attorney, Agent, or Firm* — Canon U.S.A. Inc., IP Division

(57) ABSTRACT

An electrochromic element includes a pair of electrodes and an electrochromic layer disposed between the pair of electrodes. The electrochromic layer contains an electrochromic material, a solvent, and a cyanoethylated polymer.

14 Claims, 9 Drawing Sheets

ELECTROCHROMIC ELEMENT, OPTICAL FILTER, LENS UNIT, IMAGING DEVICE, AND WINDOW COMPONENT

BACKGROUND OF THE INVENTION

Field of the Invention

The present disclosure relates to an electrochromic element, an optical filter, a lens unit, an imaging device, and a window component.

Description of the Related Art

An electrochromic element is an electronic element or device including a pair of electrodes and an electrochromic layer disposed between the pair of electrodes. When a voltage has been applied to the element from the pair of electrodes, electrons or holes injected into the electrochromic layer from the electrodes react with a specific compound in the electrochromic layer. The reaction of this compound varies the transmittance of the electrochromic layer, and the amount of light passing through the electrodes can be controlled by varying the transmittance of the electrochromic layer.

Among such electrochromic elements, organic electrochromic elements using organic electrochromic molecules can control the amount of light in a wide range and facilitate the design of the spectral transmittance thereof, thus useful as variable neutral density (ND) filters used in imaging devices.

An electrochromic element using organic electrochromic molecules includes an electrochromic layer containing an electrically active anodic material and an electrically active cathodic material. At least either of these materials has electrochromicity, that is, the function of forming an absorption band in at least a portion of the visible light region by an electrochemical redox reaction thereof. At this time, the oxidation reaction of the anodic material and the reduction reaction of the cathodic material occur simultaneously at the corresponding electrodes. This creates a state where the electrochromic element lies in a closed circuit, consequently causing a current to flow in the electrochromic element.

If an electrochromic element is disposed in an imaging device as a variable ND filter of the imaging device, the electrochromic element is exposed to heat generated in an imaging element and heat from a circuit board, and further exposed to heat from light condensed through a lens system. The ambient temperature around the electrochromic element thus exposed to heat generated from the imaging element and the like can rise to 100° C. or more.

Japanese Patent Laid-Open No. 2000-075326 discloses a solution-phase electrochromic element having a heat resistance increased by adding an acrylic resin to the electrochromic solution thereof. U.S. Pat. No. 4,902,108 discloses an electrochromic device, or electrochromic element, in which the viscosity of the electrochromic layer is increased by adding an acrylic material into the electrochromic solution to reduce segregation that is due to natural convection. The electrochromic layer having such an increased viscosity is prevented from scattering if it leaks from the electrochromic element.

SUMMARY OF THE INVENTION

According to an aspect of the present disclosure, there is provided an electrochromic element including a pair of electrodes, and an electrochromic layer between the pair of electrodes. The electrochromic layer contains an electrochromic material, a solvent, and a cyanoethylated polymer.

Further features of the present disclosure will become apparent from the following description of exemplary embodiments with reference to the attached drawings.

DESCRIPTION OF THE EMBODIMENTS

In the solution-phase electrochromic elements using a solution prepared by dissolving an electrochromic material in a solvent, the viscosity of the solution decreases as the temperature of the device increases. Such decrease in the viscosity of the solution promotes a self-bleaching reaction (a self-decoloring reaction) in the solution as the current applied to the electrochromic element increases. Accordingly, the maximum optical density of the device decreases disadvantageously in the coloring process.

Increase in the current that should be applied to the element leads to increased power consumption and is also disadvantageous in terms of durability. In order to avoid decrease in maximum optical density, a cell gap (optical path length) may be increased to ensure a density, or an electrochromic material is further dissolved in the solution. However, the former approach is disadvantageous in terms of response speed, and the latter approach is difficult due to the solubility of the electrochromic material.

The approach of adding an acrylic resin to the solution layer, as in the case of the electrochromic element disclosed in the above-cited Japanese Patent Laid-Open No. 2000-075326, is effective in suppressing current increase, but is not much effective in preventing decrease in optical density. The electrochromic element disclosed in U.S. Pat. No. 4,902,108 has the same tendency as the electrochromic element of Japanese Patent Laid-Open No. 2000-075326.

The following embodiments provide electrochromic elements that can operate stably over a wider range of temperatures than previously possible.

Embodiments

In the present embodiment is described an electrochromic element including a pair of electrodes and an electrochromic layer disposed between the pair of electrodes. The electrochromic layer contains an electrochromic material and a solvent, and also contains a cyanoethylated polymer. In the following description, the electrochromic element may be referred to as the EC element, and the electrochromic layer may be referred to as the electrochromic medium or EC medium.

1. EC Element

The EC element of the present embodiment will be described in detail with reference to the drawings. The structure of the EC element, including relative arrangement, is not particularly limited to the structure disclosed below, unless otherwise specified.

Figure 1:
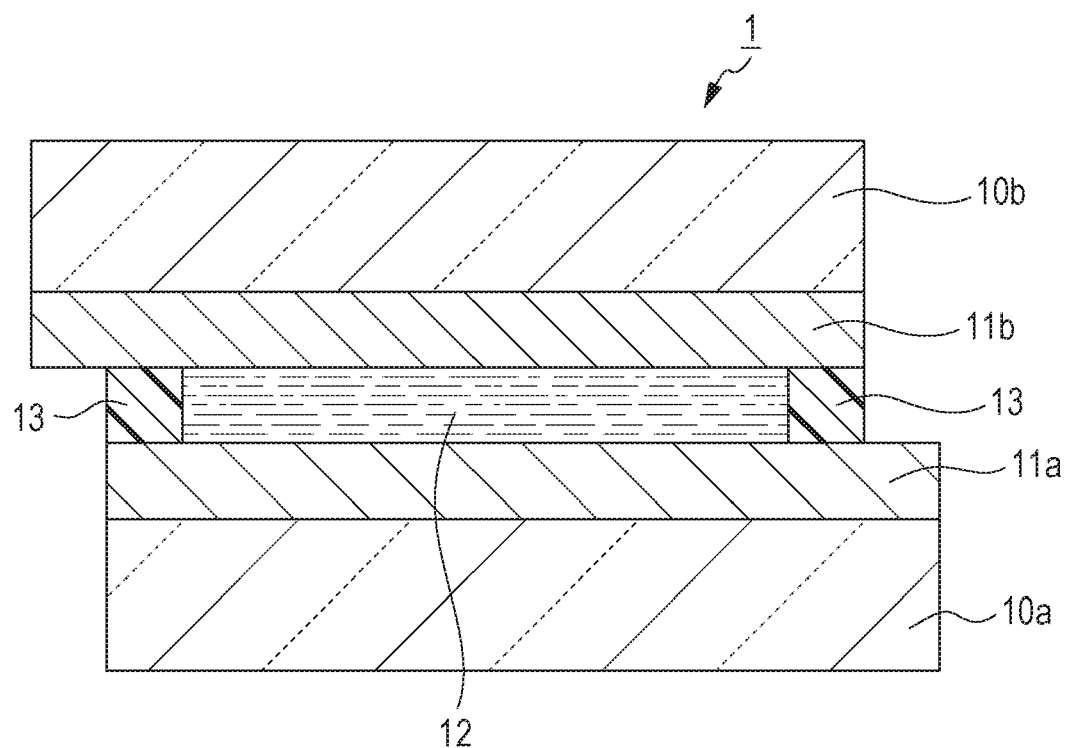
FIG. 1 is a schematic sectional view of an electrochromic element according to an embodiment of the present disclosure.

FIG. 1 is a schematic sectional view of an electrochromic element (EC element) according to the present embodiment.

The EC element 1 shown in FIG. 1 includes two substrates, each having an electrode. More specifically, the EC element 1 includes a substrate 10a having an electrode 11a on a specific surface thereof, and a substrate 10b having an electrode 11b on a specific surface thereof. These substrates (10a, 10b) are disposed in such a manner that the electrodes (11a, 11b) are opposed to each other. Desirably, at least one of the substrates (10a, 10b) transmits light. Hence, it is desirable that at least one of the substrates (10a, 10b) be transparent. Although a glass substrate that will be described later may be used as the transparent substrate, the material of the substrates (10a, 10b) shown in FIG. 1 is not limited to glass. If both the substrates (10a, 10b) are transparent, the EC element 1 may be used as an element that transmits at least a light having a specific wavelength, that is, light not absorbed in the EC medium 12 in a colored state. The substrate capable of transmitting light of the pair of substrates (10a, 10b) desirably has a transparent electrode as the electrode thereof.

The space between the electrodes (11a, 11b) is filled with the EC medium 12. The EC medium 12 contains at least one EC material and a solvent. The EC medium 12 in FIG. 1 is sealed with a sealant 13. The sealant 13 may contain gap control particles (not shown) that controls the gap between the electrodes 11a and 11b.

Components or members of the EC element of the present embodiment will now be described.

The substrates (10a, 10b) are desirably glass substrates having a high light transparency. Examples of the material of the glass substrate include optical glass, quartz glass, white sheet glass, blue sheet glass, borosilicate glass, non-alkali glass, and chemically reinforced glass. From the viewpoint of transparency and durability, non-alkali glass is advantageously used.

The electrodes (11a, 11b) disposed on the substrates (10a, 10b) are thin-layer electrodes deposited on the respective substrates and are otherwise not limited. However, the electrode, of these electrodes (11a, 11b), that transmits at least a light having a specific wavelength, as with the corresponding substrate, desirably has a transmittance in the range of 50% to 100% to the light having the specific wavelength. Such an electrode capable of transmitting light is desirably transparent. The transparent electrode may be a thin-layer electrode formed by depositing a transparent electroconductive oxide. Examples of the transparent electroconductive oxide used in the present embodiment include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO).

In the EC element 1 shown in FIG. 1, the substrates (10a, 10b) may be provided with other members, in addition to the electrodes (11a, 11b) each disposed on a specific surface of the corresponding substrate (10a, 10b). In the case of using glass substrates as the substrates (10a, 10b) and transparent electrodes as the electrodes (11a, 11b), the substrates (10a, 10b) may have an antireflection layer (not shown) or an index matching layer (not shown), if necessary. In this instance, the antireflection layer and the index matching layer are intended to reduce reflection of light at the surface of the glass substrate, the interface between the glass substrate and the transparent electrode, and the interface between the transparent electrode and the EC medium, and thus to increase the transmittance of the EC element.

The EC medium 12 of the EC element 1 shown in FIG. 1 contains an EC material, a solvent, and a cyanoethylated polymer. The cyanoethylated polymer will be described in detail later.

The EC material contained in the EC medium 12 is desirably a compound whose transmittance to visible light is varied by redox reaction. For example, organic compounds such as thiophene compounds, phenazine compounds, and bipyridinium salts are advantageously used.

The solvent contained in the EC medium 12 is a substance that can dissolve the EC material, the cyanoethylated polymer (described later), and an electrolyte and is otherwise not limited. Desirably, a polar solvent is used. Examples of the solvent include water and organic solvents, such as methanol, ethanol, propylene carbonate, ethylene carbonate, dimethyl sulfoxide, dimethoxyethane, γ-butyrolactone, γ-valerolactone, sulfolane, dimethylformamide, tetrahydrofuran, acetonitrile, propionitrile, benzonitrile, dimethylacetamide, methylpyrrolidinone, and dioxolane. Among these, carbonate esters, such as propylene carbonate and ethylene carbonate, are advantageously used.

The EC medium 12 of the EC element 1 may contain an additional ingredient, such as a supporting electrolyte.

The supporting electrolyte is an ionically dissociable salt soluble in the solvent and is otherwise not limited. Desirably, an electron-donating electrolyte is used. Examples of such an electrolyte include inorganic ionic salts including alkali metal salts and alkaline-earth metal salts, quaternary ammonium salts, and cyclic quaternary ammonium salts. More specifically, examples of the electrolyte include alkali metal (Li, Na, or K) salts, such as $LiClO_4$, LiSCN, $LiBF_4$, $LiAsF_6$, $LiCF_3SO_3$, $LiPF_6$, LiI, NaI, NaSCN, $NaClO_4$, $NaBF_4$, $NaAsF_6$, KSCN, and KCl; and quaternary ammonium salts or cyclic quaternary ammonium salts, such as $(CH_3)_4NBF_4$, $(C_2H_5)_4NBF_4$, $(n-C_4H_9)_4NBF_4$, $(n-C_4H_9)_4NPF_6$, $(C_2H_5)_4NBr$, $(C_2H_5)_4NClO_4$, and $(n-C_4H_9)_4NClO_4$.

The EC medium 12 is disposed in a space surrounded by the electrodes (11a, 11b) or the substrates (10a, 10b) and the sealant 13. For disposing the EC medium 12 in the space, vacuum injection or a one drop fill (ODF) method may be used.

In the case of using vacuum injection, a cell having an opening through which the EC medium 12 is introduced is prepared or formed. The cell may be formed by, for example, bonding the substrates (10a, 10b) together in such a manner that the electrodes (11a, 11b) are opposed to each other. The opening of the cell may be formed, for example, by: (i) perforating at least one of the substrates (10a, 10b); or (ii) forming an opening in a portion of the side of the EC element 1.

In the case of (i), after necessary members including the electrodes (11a, 11b) are formed on the substrates (10a, 10b), an opening (not shown) may be formed. The number of openings formed in the substrates (10a, 10b) by the method of (i) may be one or two or more. The opening may be formed in at least either of the substrates 10a and 10b.

In the case of (ii), when a resin material is applied onto either of the substrates (10a, 10b) for bonding the substrates (10a, 10b) together, the region to which the resin material is to be applied may be appropriately adjusted. Thus, an opening is formed in a portion of the side of the EC element 1. In this instance, the number of openings in the cell may be one or two or more.

If an ODF method is employed, the EC medium and the resin material may be arranged on either of the substrates (10a, 10b) in such a manner that the resin material surrounds the EC medium. Such arrangement of the EC medium and the resin material allows the EC medium 12 to be disposed in a closed space defined by the substrates (10a, 10b) and the sealant 13 when the substrates (10a, 10b) are bonded together under vacuum conditions.

In the EC element 1 shown in FIG. 1, the sealant 13, which prevents the EC medium 12 from leaking, may be formed by curing a resin material, such as a thermosetting resin or a UV-curable resin. Although any thermosetting resin or UV curable resin may be used as the resin material for forming the sealant 13 without particular limitation, the resin material is appropriately selected in view of the method for injecting or introducing the EC medium or the process for manufacturing the EC element. Incidentally, it is advantageous to add gap control particles in the resin material for controlling the distance between the electrodes (11a, 11b).

The cyanoethylated polymer contained in the EC medium will now be described. A cyanoethylated polymer refers to a polymer the polymer chain of which has a cyanoethyl group ($-CH_2CH_2CN$) converted from an active hydrogen by a polymer reaction. The active hydrogen is present in $-OH$, $-SH$, or the like of the polymer chain, and the hydrogen bound to the $\alpha$-carbon adjacent to the carbonyl group ($>C=O$) of an aldehyde group or a ketone group is also applicable to the active hydrogen. In the cyanoethylated polymer used in the present embodiment, the percentage of active hydrogens converted into cyanoethyl groups, that is, conversion rate, may be, but is not limited to, 70% to 90%, such as 80% to 90%.

In the present embodiment, the cyanoethylated polymer is desirably selected from the group consisting of cyanoethyl polyvinyl alcohol, cyanoethyl pullulan, and cyanoethyl cellulose. The cyanoethylated polymer is however not limited to these and may be a copolymer of at least two of these polymers. Also, the cyanoethylated polymer may be a mixture of two or more cyanoethylated polymers.

The cyanoethylated polymer is commercially available, and examples thereof include a cyanoethyl polyvinyl alcohol CR-V (softening point: 20° C. to 40° C., dielectric constant: 18.9, produced by Shin-Etsu Chemical), a cyanoethyl pullulan CR-S (softening point: 90° C. to 100° C., dielectric constant: 18.9, produced by Shin-Etsu Chemical), cyanoethyl cellulose CR-C (softening point: 200° C. or more, dielectric constant: 16, produced by Shin-Etsu Chemical), and a cyanoethyl pullulan-cyanoethyl polyvinyl alcohol mixture CR-M (softening point: 40° C. to 70° C., dielectric constant: 18.9, produced by Shin-Etsu Chemical). These cyanoethylated polymers can impart two conflicting properties, a high viscosity and a high ionic conductivity, to the EC medium 12 and balance the two properties, over a wide range of temperatures.

A mixture of a plurality of cyanoethylated polymers having different softening points may be added to the EC medium 12 so as to vary the softening point of the EC medium 12 as desired. For example, the viscosity of the EC medium can be kept high in the range of guaranteed operating temperatures by setting the softening point of the EC medium to higher than the upper limit of the guaranteed operating temperatures of the EC element 1. Thus, increase in the current that should be applied to the EC element can be suppressed by such control of the softening point.

In order to suppress the decrease in the optical density of the EC medium 12, self-bleaching reaction in the EC medium is suppressed. The present inventors made experiments using a variety of polymer thickeners and obtained the unexpected result that adding a polymer having a high dielectric constant to the EC medium 12 is effective in suppressing the self-bleaching reaction. In order to suppress self-bleaching reaction, probably, it is important to establish a uniform concentration distribution of colored molecules throughout the entire region between the electrodes without inhibiting the migration of the colored molecules, and to make it difficult to form a reaction field for the self-bleaching reaction.

Common polymer thickeners that the EC medium 12 may contain include polyethylene oxide, polyacrylonitrile, polyvinylidene fluoride, polyvinyl pyrrolidone, polymethyl methacrylate, and polycarbonate. Unfortunately, the dielectric constants of these polymer thickeners are about 3 to 8. On the other hand, the dielectric constants of the above-cited cyanoethylated polymers are as unusually high as about 19. This satisfies the above-mentioned two important points, and thus leads to the realization of an EC element whose maximum optical density does not decrease even when operating at a high temperature.

In the present embodiment, the cyanoethylated polymer content in the EC medium 12 may be appropriately determined in view of suppressing current increase and decreasing in bleaching response speed. Desirably, the proportion of the cyanoethylated polymer is 20% by weight to less than 40% by weight relative to the weight of the solvent. When a cyanoethylated polymer is added to the EC medium 12, the temperature coefficient of the optical density of the EC medium 12 varies. The lower the absolute value of the temperature coefficient of optical density in a temperature range, for example, from room temperature (20° C. to 25° C.) to 80° C., the more stably the EC element operates. Hence, a lower absolute value of the temperature coefficient is desirable. More specifically, it is advantageous to control the temperature coefficient of optical density in the range of $-0.2\%/°$ C. to less than $+0.2\%/°$ C. By adding a cyanoethylated polymer in a proportion of 20% by weight to less than 40% by weight relative to the weight of the solvent, the temperature coefficient of the optical density of the EC medium 12 is controlled in the range of $-0.2\%/°$ C. to less than $+0.2\%/°$ C.

Thus, the present embodiment can provide an electrochromic element that can operate stably over a wider range of temperatures than previously possible.

2. Use of EC Element

The EC element of the present embodiment can be used as a component of an optical filter, a lens unit, an imaging device, a window component, and the like.

An optical filter according to an embodiment of the present disclosure includes the EC element of the above described embodiment, and an active element electrically connected to the EC element. The active element of the optical filter drives the EC element and controls the amount of light passing through the EC element. The active element connected to the EC element may be an amplifying element or a switching element. More specifically, the active element may be a transistor or a MIM element.

A lens unit according to an embodiment of the present disclosure includes an optical filter including the EC element of the above-described embodiment, and an imaging optical system. The optical filter controls the amount of light passing through the imaging optical system, or the amount of light after passing through the imaging optical system. The imaging optical system is a lens set including a plurality of lens elements. The optical filter of the lens unit may be disposed between lenses or outside the lenses.

An imaging device according to an embodiment of the present disclosure includes an optical filter and an imaging element capable of receiving light after passing through the optical filter. The imaging element of the imaging device receives light after passing through the optical filter and may be referred to as the light-receiving element.

More specifically, the imaging device may be a digital camera, a digital video camera, or the like. An imaging optical system may be removably mounted to the imaging device. In other words, the imaging device may be such that a lens unit including at least one lens is separable from the main body of the imaging device including an imaging element.

If the lens unit is separable from the main body of the imaging device, an optical filter apart from the imaging device may be used for imaging in an embodiment of the present disclosure. In this instance, the optical filter may be disposed outside the lens unit, between the lens unit and the light-receiving element, or between the lenses (when the lens unit includes a plurality of lenses).

If the EC element of the above-described embodiment is used in an imaging device, such as a camera, the amount of light can be reduced without reducing the gain of the imaging element.

A window component according to an embodiment of the present disclosure includes a pair of transparent substrates, an EC element disposed between the transparent substrates, and an active element connected to the EC element and capable of controlling the transmittance of the EC element. The amount of light passing through the pair of transparent substrates is controlled by the EC element. The window component to which a window frame is attached can be used as a window. The window component may be used for, for example, a window of an automobile, a window of a plane, a window of a building material, or the like.

Figure 2:
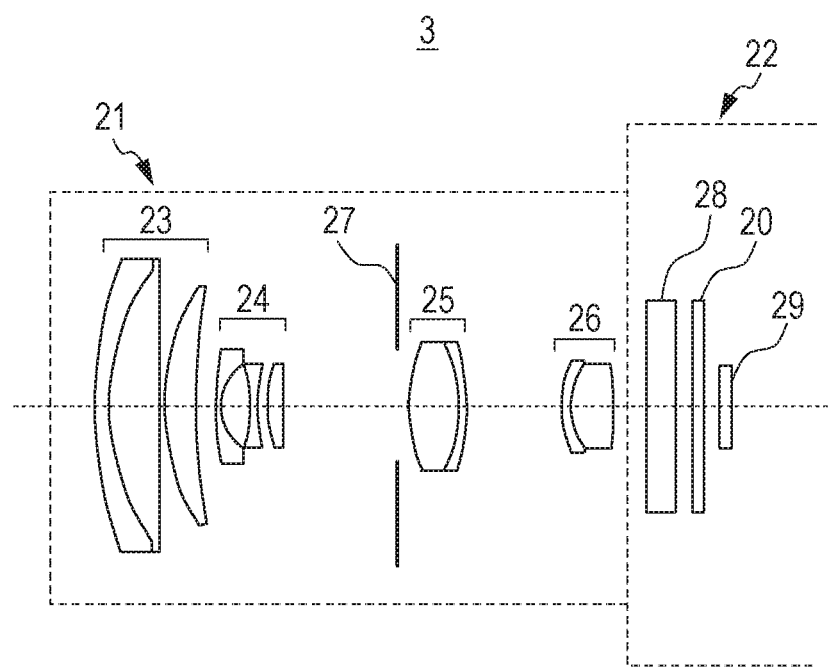
FIG. 2 is a schematic sectional view of an imaging device according to an embodiment of the present disclosure.

FIG. 2 is a schematic sectional view of an imaging device according to an embodiment of the present disclosure.

The imaging device 3 shown in FIG. 2 includes a lens unit 21 and an imaging unit 22. The lens unit 21 is removably connected to the imaging unit 22 with a mount (not shown) therebetween. An optical filter 20 is disposed within the imaging unit 22.

In the embodiment shown in FIG. 2, the lens unit 21 includes a plurality of lenses or lens sets, and acts as a rear focusing zoom lens that focuses on the side closer to the imaging unit 22 than to a diaphragm.

In FIG. 2, the lens unit 21 includes four lens sets: a first lens set 23 having a positive refractive power, a second lens set 24 having a negative refractive power, a third lens set 25 having a positive refractive power, and a fourth lens set 26 having a positive refractive power, arranged in that order from the object side. The structure shown in FIG. 2 has an aperture stop 27, or diaphragm 27, between the second lens set 24 and the third lens set 25. The imaging device 3 focuses by varying the distance between the second lens set 24 and the third lens set 25 to vary magnification, and moving some lenses of the fourth lens set 26. The members or components of the imaging device 3 are arranged so that light passing through the lens unit 21 can pass through each of the lens sets 23 to 26, the diaphragm 27, and the optical filter 20 and be then received by an imaging element 29. The amount of light to be received by the imaging element 29 is controlled by using the aperture stop 27 and the optical filter 20. The imaging unit 22 shown in FIG. 2 includes a glass block 28 and the imaging element 29. The optical filter 20 is disposed between the glass block 28 and the imaging element 29.

The glass block 28 may be, for example, a low-pass filter, a face plate, or a color filter.

The imaging element 29 is a sensor that receives light after passing through the lens unit 21 and may be, for example, a CCD or a CMOS element. Alternatively, the imaging element 29 may be a light sensor such as a photodiode, or any other element or device capable of obtaining and outputting information such as light intensity or wavelength.

In the embodiment shown in FIG. 2, the optical filter 20 is disposed between the glass block 28 and the imaging element 29 within the imaging unit 22. However, the position of the optical filter 20 is not particularly limited to such a position, and, in an embodiment of the present disclosure, the optical filter 20 may be disposed between the second lens set 24 and the third lens set 25 or outside the lens unit 21.

It is advantageous to dispose the optical filter 20 at a position to which light converges. In such an arrangement, for example, the area of the optical filter 20 can be reduced. In an imaging device according to an embodiment of the present disclosure, the lens unit 21 may be of a type other than the rear focusing type, and may be, for example, of an inner focusing type that focuses on the front side of the diaphragm. Also, the lens unit 21 may act as a special lens such as a fisheye lens or a microlens, as well as the zoom lens.

The imaging device may be a device including a combination of a mechanism capable of controlling the amount of light and an imaging element, and may act as an imaging section of cameras, digital cameras, video cameras, digital video cameras, mobile phones including smartphones, or PCs including tablet computers.

The electrochromic element of the present disclosure can be used in an optical filter, a lens unit, an imaging device, a window component, and the like, and such devices using the electrochromic element of the present disclosure can operate stably over a wider range of temperatures than previously possible.

EXAMPLES

Examples of the EC element will now be described. It is however not limited to the following Examples.

Example 1

The EC element 1 shown in FIG. 1 was produced according to the following procedure. First, ITO was deposited on a 0.7 mm thick glass substrate (EAGLE-XG, manufactured by Corning) to yield a substrate having an electrode (hereinafter referred to as electrode-mounted substrate). The sheet resistance of the electrode deposited on the glass substrate was 10 Ω/sq. Two electrode-mounted substrates were formed in this manner for use in the following step. The electrode-mounted substrates are such that a substrate 10a and a substrate 10b have an electrode 11a and an electrode 11b, respectively.

Subsequently, gap control particles (Micro-pearl SP (50 μm in diameter), produced by Sekisui Chemical) and a thermosetting epoxy resin (Structbond HC-1850, produced by Mitsui Chemicals) were kneaded into a kneaded mixture. Then, the kneaded mixture was applied onto the surface having the electrode of one of the two electrode-mounted substrates. For applying the kneaded mixture, the region to which the kneaded mixture was to be applied was appropriately selected, and a dispenser was used in such a manner that a pattern having an opening through which an EC medium would be injected was formed. Subsequently, the electrode-mounted substrate onto which the kneaded mixture was applied and the other electrode-mounted substrate onto which the kneaded mixture was not applied were bonded together in such a manner that the electrodes were opposed to each other, and the kneaded mixture was cured to form a cell in which the EC medium would be held. The cell has a gap of 50 μm between the electrode 11a and the electrode 11b.

Subsequently, an EC medium was prepared by mixing the following materials and solvent.
 Anodic EC material A (Phenazine compound), expressed by the following formula (A)
 Cathodic EC material B (bipyridinium salt), expressed by the following formula (B)
 Cyanoethyl pullulan CR-S (produced by Shin-Etsu Chemical, average molecular weight: 49,000, softening point: 90° C. to 100° C., dielectric constant: 18.9)
 Propylene carbonate

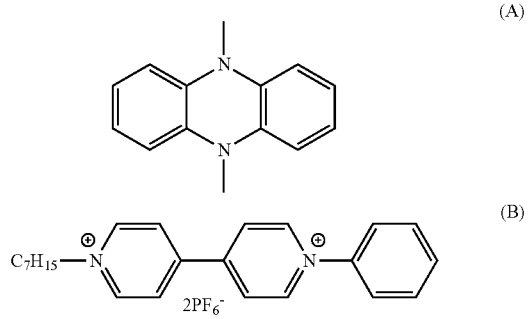

The concentrations of the EC materials (EC material A and EC material B) were each 100 mM in the EC medium. The proportion of the cyanoethyl pullulan was 30% by weigh to the solvent (propylene carbonate).

Subsequently, the EC medium was injected into the cell by vacuum injection, followed by sealing the opening with an UV-curable epoxy resin. Thus, an EC element was completed.

Comparative Example 1

An EC element was produced in the same manner as in Example 1, except that cyanoethyl pullulan was not added to the EC medium.

Comparative Example 2

An EC element was produced in the same manner as in Example 1, except that polymethyl methacrylate (produced by Aldrich, average molecular weight: 1,000,000 or less, softening point: 100° C., dielectric constant: 3.3) was used instead of cyanoethyl pullulan.

Comparative Example 3

An EC element was produced in the same manner as in Example 1, except that polycarbonate PCZ-800 (produced by Mitsubishi Gas Chemical, average molecular weight: 80,000 or less, softening point: 174° C., dielectric constant: 3.1) was used instead of cyanoethyl pullulan.

Evaluation of EC Elements

Figure 3A:
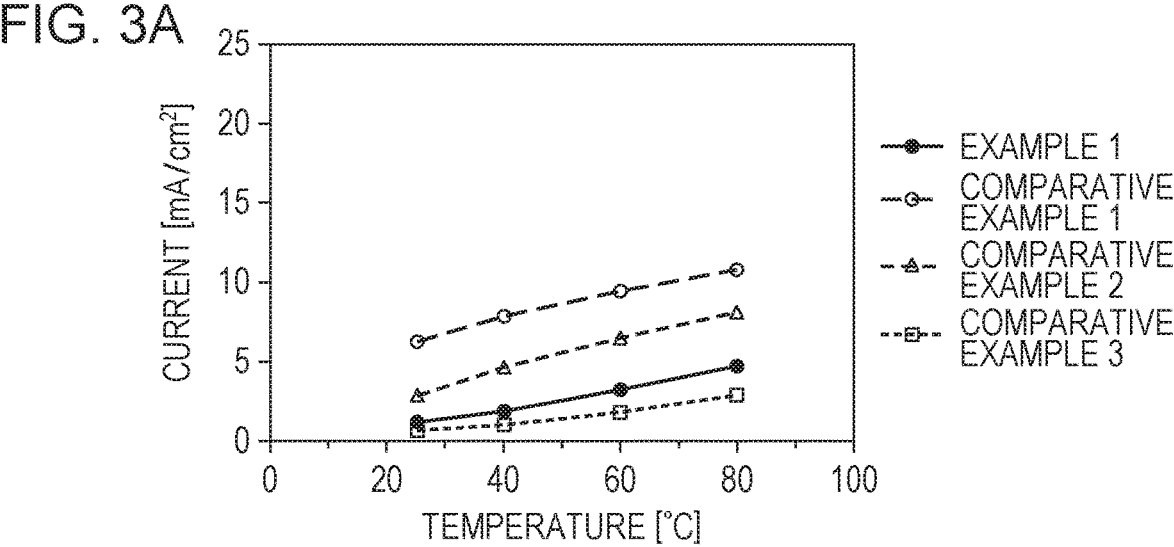
FIG. 3A is a plot of the temperature dependences of the current in EC elements produced in an Example and Comparative Examples.
Figure 3B:
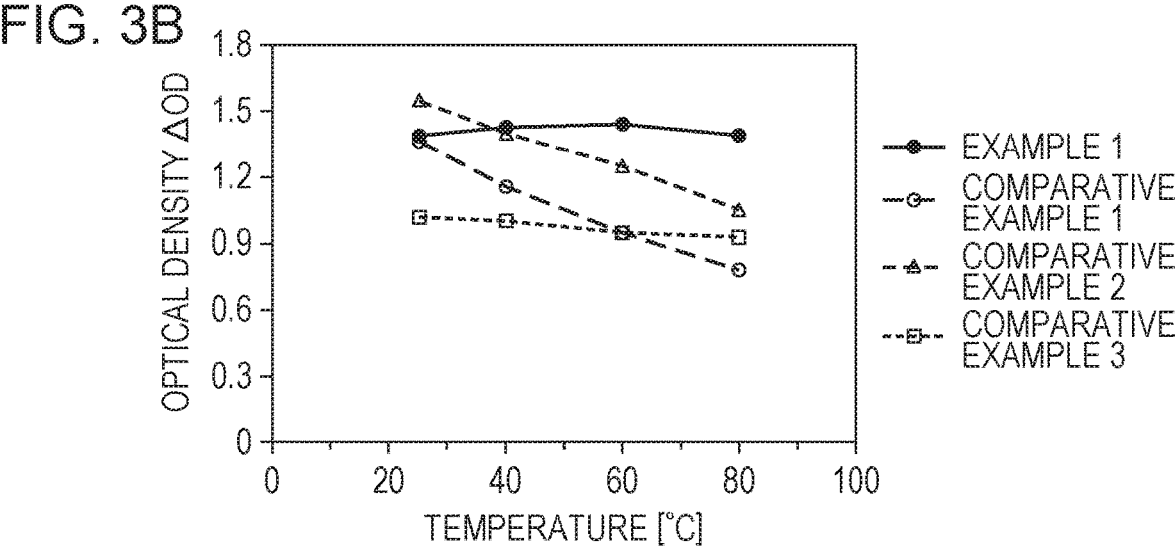
FIG. 3B is a plot of the temperature dependences of the optical density of EC elements produced in an Example and Comparative Examples.
Figure 3C:
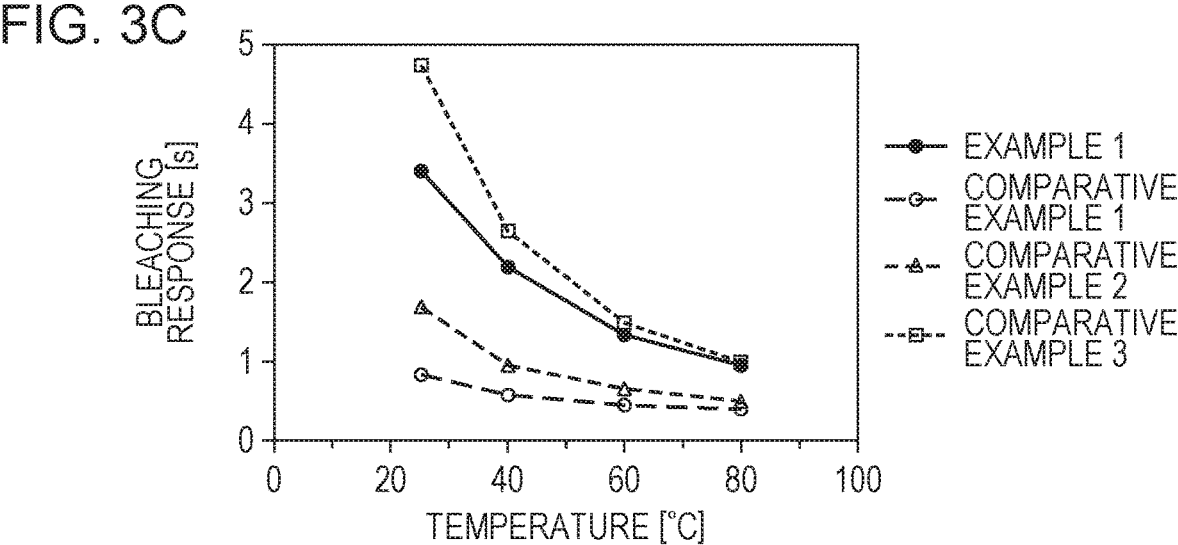
FIG. 3C is a plot of the temperature dependences of the bleaching response of EC elements produced in an Example and Comparative Examples.

The electrical properties and optical properties of the EC elements of the Example and the Comparative Examples were subjected to measurements in a measuring system with a heating mechanism, capable of measuring both electrochemical properties and transmittance at one time. FIGS. 3A to 3C show the results of the measurements. FIG. 3A is a plot of characteristics of the current (temperature dependences of the current) of each of the EC elements, and FIG. 3B is a plot of characteristics of the optical density (temperature dependences of the optical density) of each of the EC elements. Also, FIG. 3C is a plot of characteristics of the bleaching response (temperature dependences of the bleaching response) of each of the EC elements.

In the EC element of Comparative Example 1 including an EC medium not containing any polymer component, as the temperature of the EC medium was raised, the current applied to the EC element increased, and optical density of the EC element decreased. At this time, the temperature coefficient of the optical density of the EC medium was −0.8%/° C.

The EC element of Comparative Example 2 contained polymethyl methacrylate as a polymer component in the EC medium. In this EC element, the current applied thereto was lower than that in Comparative Example 1 at each temperature, and the absolute value of the temperature coefficient of the optical density of the EC medium decreased. Hence, the EC element of Comparative Example 2 is considered to be slightly better than that of Comparative Example 1. However, the tendency for the optical density to decrease with increasing temperature was the same as in Comparative Example 1, and the temperature coefficient of the optical density of the EC medium was −0.6%/° C.

The EC element of Comparative Example 3 contained polycarbonate as a polymer component in the EC medium. This EC element was satisfactorily improved in reducing current applied thereto at each temperature compared with the EC element of Comparative Example 1, and the temperature coefficient of the optical density of the EC medium was as small as −0.2%/° C. In Comparative Example 3, however, the optical density of the EC element was low even when the EC medium was not heated (in an environment of room temperature), and the average thereof was low, accordingly. Also, in Comparative Example 3, the bleaching response of the EC element was very slow.

In Example 1, the EC element contained cyanoethyl pullulan that is a cyanoethylated polymer as a polymer component. This EC element was greatly improved in reducing current applied to the EC element at each temperature. Also, the EC element of Example 1 exhibited a high optical density at any temperature, and the temperature coefficient of the optical density was +9.1 ppm/° C.; hence, the optical density hardly varies even though temperature is varied (tends to increase slightly with increasing temperature).

Figure 4A:
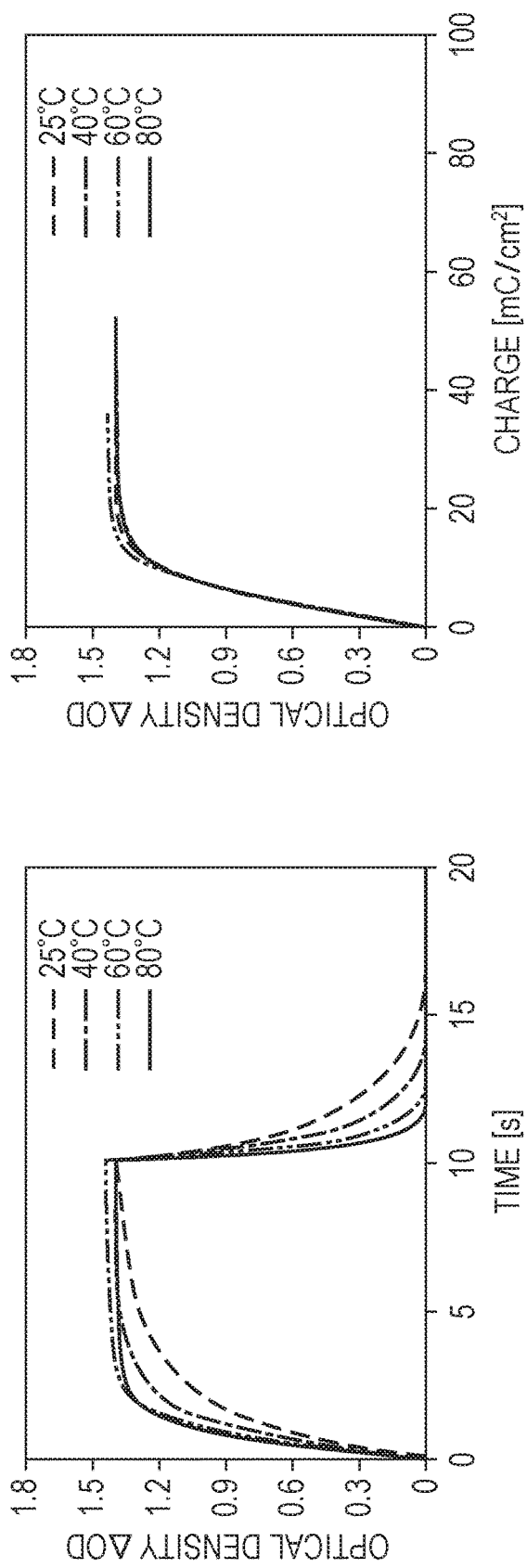
FIG. 4A is a graphic representation of characteristics of the optical density of the EC element produced in Example 1.
Figure 4B:
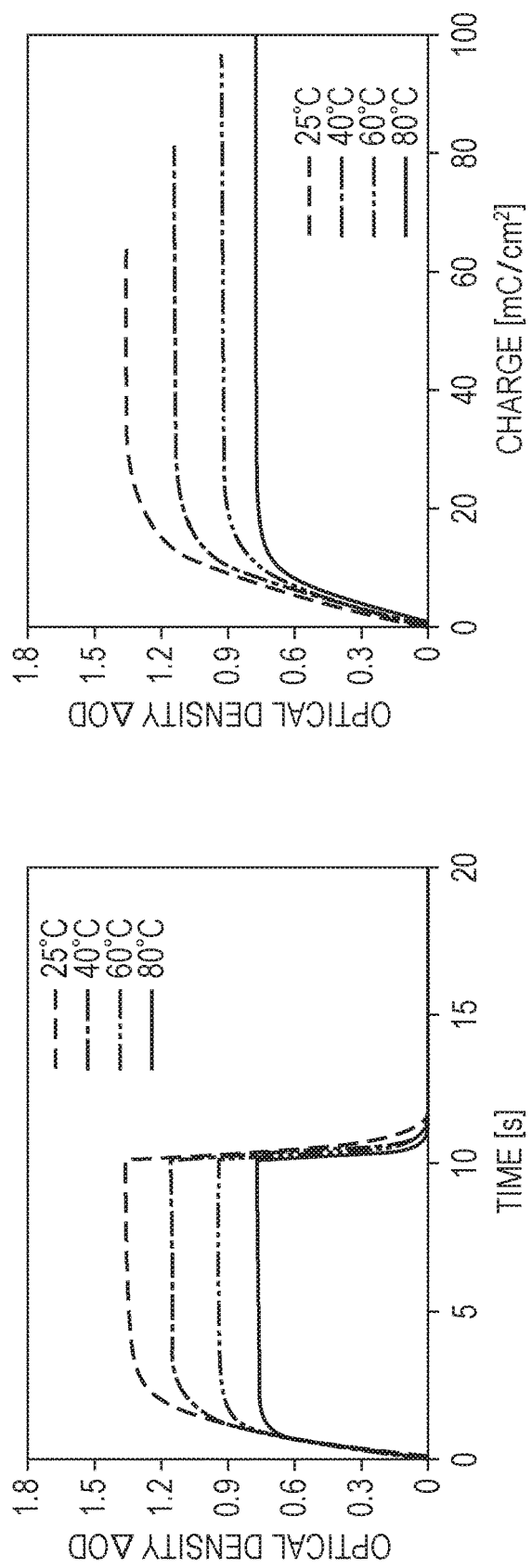
FIG. 4B is a graphic representation of characteristics of the optical density of the EC element produced in Comparative Example 1.
Figure 4C:
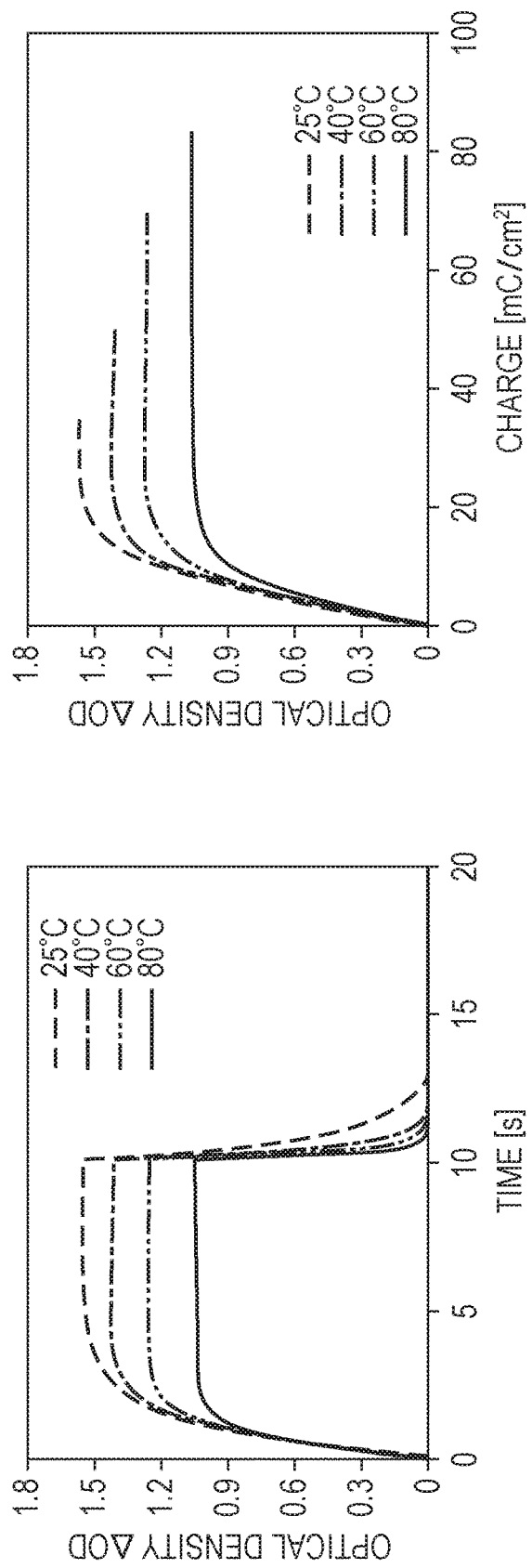
FIG. 4C is a graphic representation of characteristics of the optical density of the EC element produced in Comparative Example 2.
Figure 4D:
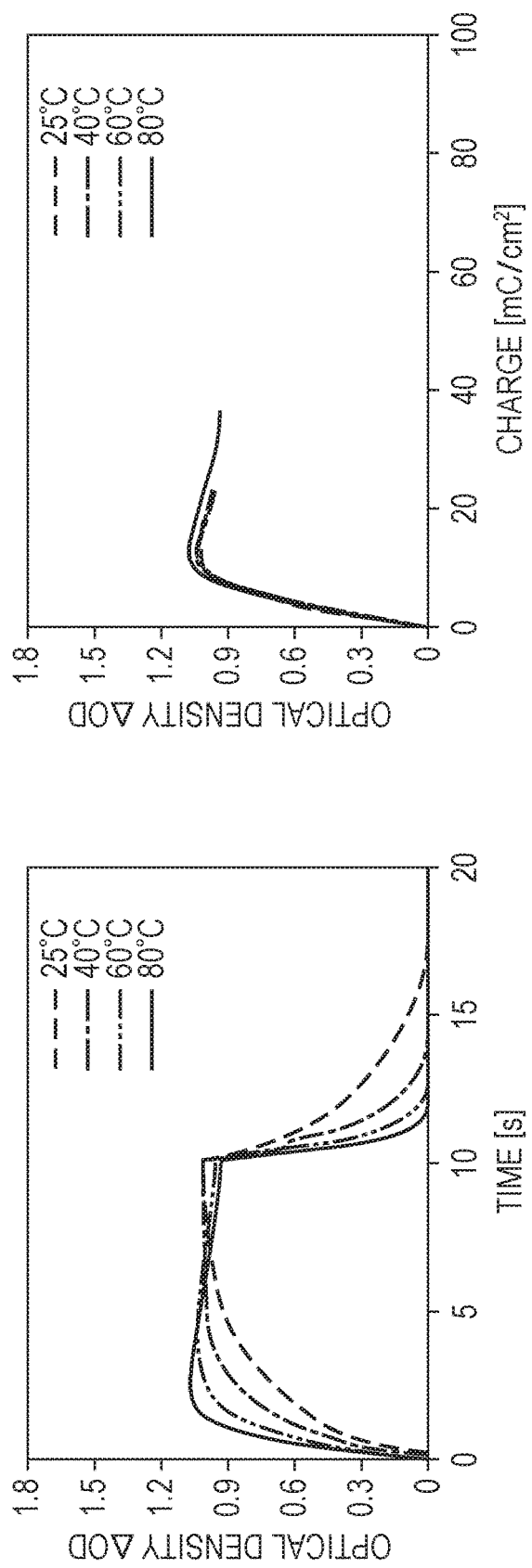
FIG. 4D is a graphic representation of characteristics of the optical density of the EC element produced in Comparative Example 3.

FIGS. 4A to 4D show characteristics of the optical density of the EC elements produced in the Example and the Comparative Examples. More specifically, FIG. 4A shows characteristics of the optical density, specifically, changes in optical density with time and changes in optical density with charge quantity, of the EC element of Example 1; FIG. 4B, characteristics of the optical density of Comparative Example 1; FIG. 4C, characteristics of the optical density of Comparative Example 2; and FIG. 4D, characteristics of the optical density of Comparative Example 3.

For the EC element of Comparative Example 2, the maximum optical density when the EC element was energized (from 0 s to 10 s) was slightly higher than that of the EC element of Comparative Example 1, whereas the changes in optical density in the early stage of coloring were substantially the same as those of the EC element of Comparative Example 1. This suggests that the polymethyl methacrylate in the EC element of Comparative Example 2 did not produce much the effect of suppressing current increase, which has been expected by increasing the viscosity of the medium, and the tendency for the optical density to decrease with increasing temperature was substantially the same as that in Comparative Example 1.

For the EC element of Comparative Example 3, the amount of changes in optical density tends to increase with increasing temperature of the EC medium in the early stage of coloring. This suggests that the polycarbonate in the EC medium increases the viscosity of the EC medium, thereby suppressing current increase effectively. In the EC element of Comparative Example 3, however, the optical density tended to decrease with time. This suggests that the number of molecules decolored by self-bleaching reaction is larger than the number of molecules colored by electrode reaction; hence, self-bleaching reaction, that is, optical density decrease, was not much suppressed. Also, the maximum optical density was lower than that in Comparative Example 1.

For the EC element of Example 1, the amount of changes in optical density increases with increasing temperature in the early stage of coloring. This suggests that the cyanoethyl pullulan in the EC medium increases the viscosity of the EC medium, thereby suppressing current increase effectively. The maximum optical density in the range of measuring temperatures (25° C. to 80° C.) was substantially the same as the maximum optical density at room temperature (25° C.) of the EC element of Comparative Example 1, and the optical density in Example 1 did not decrease with increasing driving time of the EC element. Hence, in the EC element of Example 1, self-bleaching reaction was much suppressed.

Thus, the electrochromic element according to an embodiment of the present disclosure can operate stably over a wider range of temperatures than previously possible.

Example 2

EC elements were produced in the same manner as Example 1, except that the proportion of the cyanoethyl pullulan to the solvent in the EC medium was varied in the range of 10% by weight to 40% by weight. More specifically, the following EC elements were produced:

EC element containing 10% by weight of cyanoethyl pullulan relative to the solvent;

EC element containing 20% by weight of cyanoethyl pullulan relative to the solvent;

EC element containing 30% by weight of cyanoethyl pullulan relative to the solvent; and EC element containing 40% by weight of cyanoethyl pullulan relative to the solvent.

Each EC element was evaluated in the same manner as the EC element of Example 1.

Figure 5A:
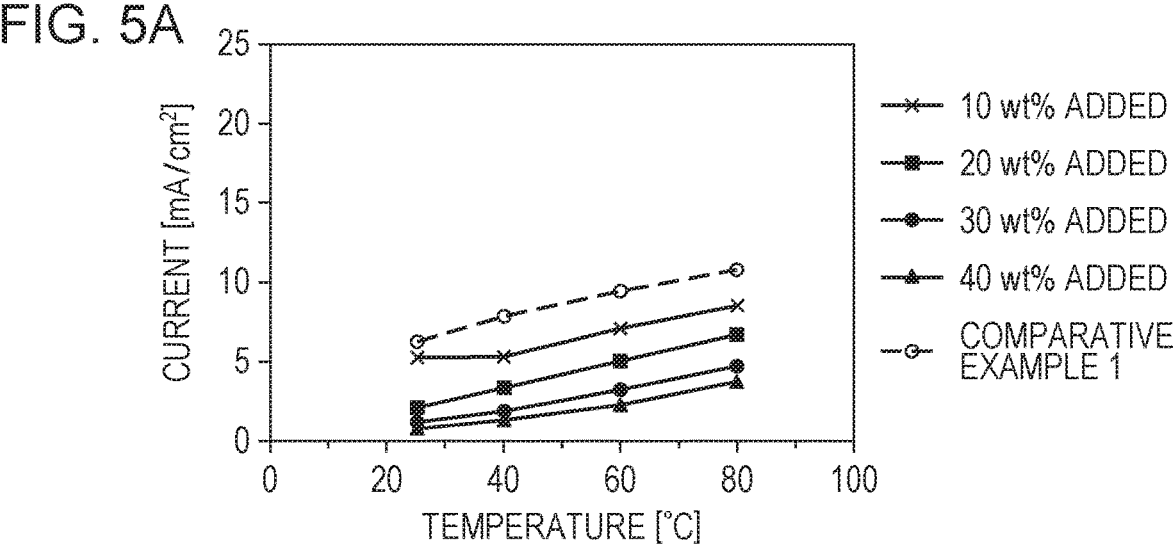
FIG. 5A is a plot of the temperature dependences of the current in EC elements produced in Example 2.
Figure 5B:
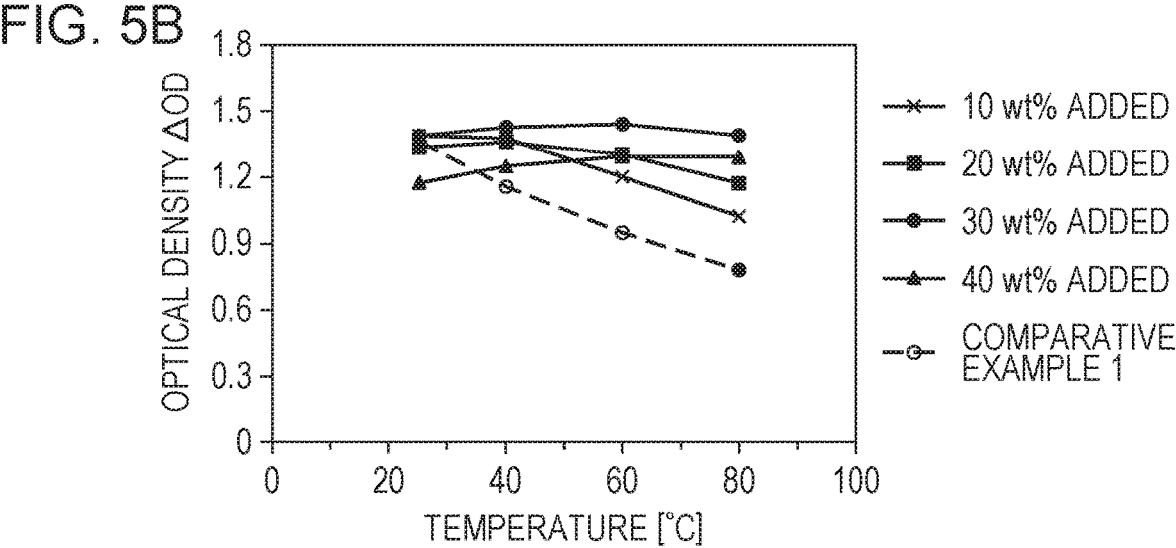
FIG. 5B is a plot of the temperature dependences of the optical density of EC elements produced in Example 2.
Figure 5C:
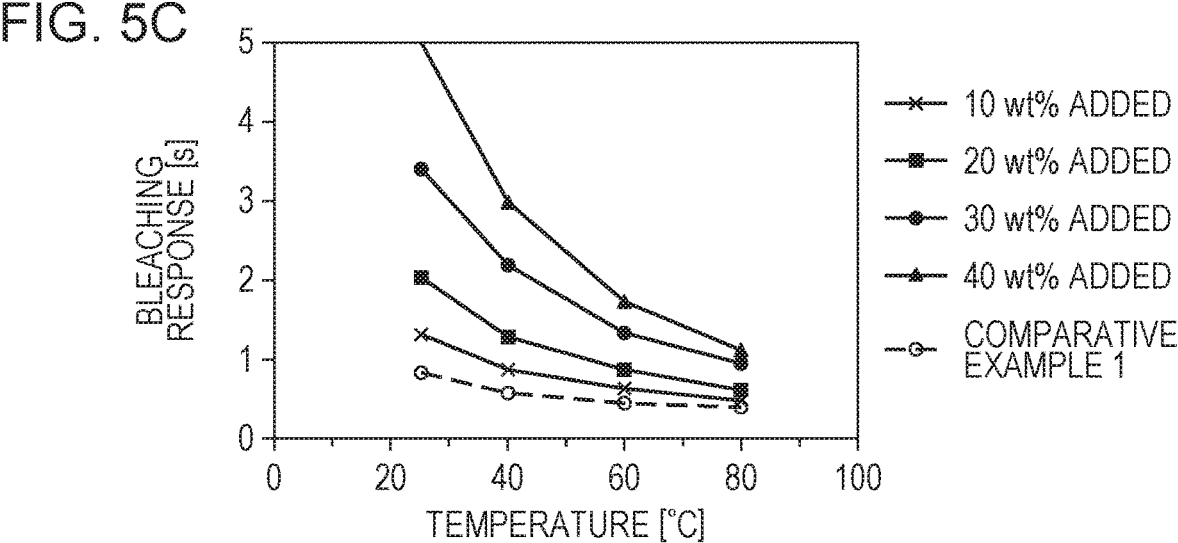
FIG. 5C is a plot of the temperature dependences of the bleaching response of the EC elements produced in Example 2.
Figure 6:
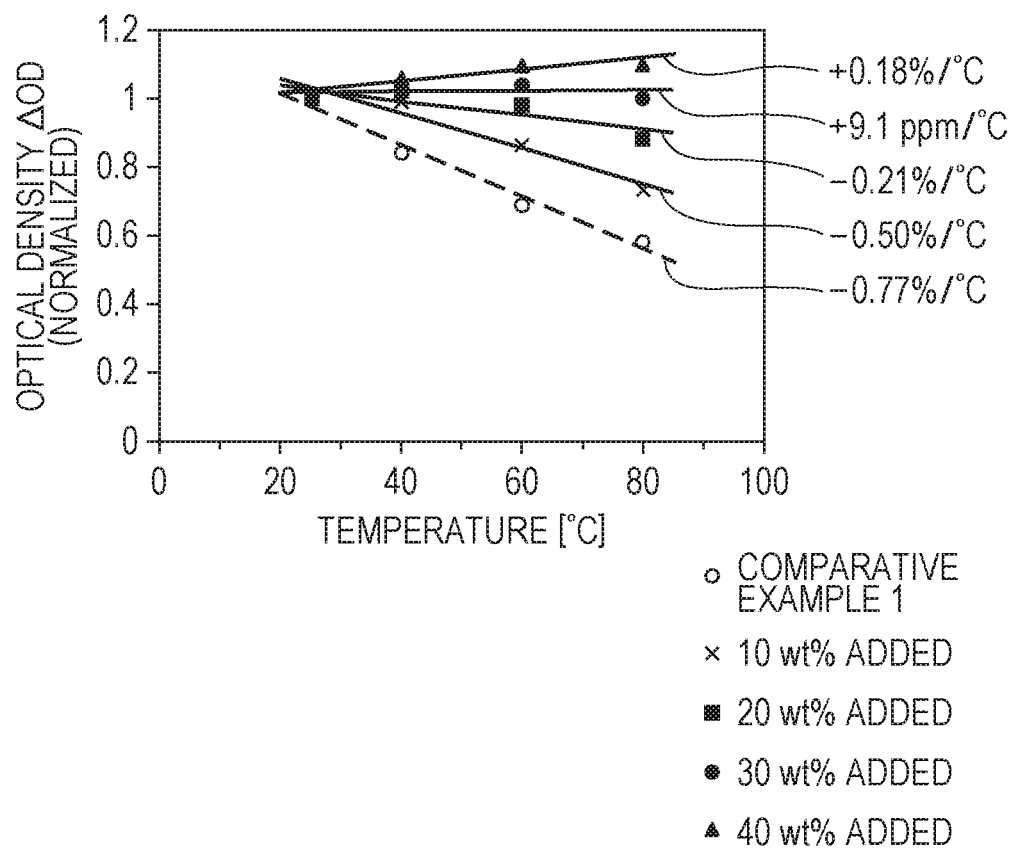
FIG. 6 is a plot showing the relationship between the temperature and the optical density of the EC elements produced in Example 2.

FIG. 5A is a plot of the temperature dependences of the current in the EC elements of Example 2. FIG. 5B is a plot of the temperature dependences of the optical density of the EC elements of Example 2, and FIG. 5C is a plot of the temperature dependences of the bleaching response of the EC elements of Example 2. FIG. 6 is a plot showing the relationship between the temperature and the optical density of the EC elements of Example 2. For reference, FIGS. 5A to 5C and FIG. 6 also show the relationships between the temperature and the optical density and other properties of the EC element of Comparative Example 1. FIG. 6 shows that as the cyanoethyl pullulan content is increased, the driving current of the element decreases and the temperature coefficient of the optical density shifts to positive values.

FIG. 5A shows that the EC element whose medium contained 10% by weight of cyanoethyl pullulan relative to the solvent was insufficient in suppressing current increase. FIG. 5B shows that the EC elements whose medium contained 30% by weight or less of cyanoethyl pullulan relative to the solvent exhibited substantially the same optical density at room temperature (25° C.) as the EC element not containing cyanoethyl pullulan. On the other hand, the optical density of the EC element whose medium contained 40% by weight of cyanoethyl pullulan relative to the solvent was lower than that of the EC element not containing cyanoethyl pullulan. This is probably because the viscosity of the EC medium was increased by increasing the cyanoethyl pullulan content. Also, it is assumed that the increase in the viscosity of the EC medium hinders the migration of the colored molecules in the EC medium and thus hinders the colored molecules from being distributed throughout the entire region between the electrodes, forming a concentration distribution biased toward the electrode surfaces. For the bleaching response, the EC element whose medium contained 40% by weight of cyanoethyl pullulan relative to the solvent took a long time for bleaching.

Accordingly, it was found that the desirable proportion of cyanoethyl pullulan content to the solvent is in the range of 20% by weight to less than 40% by weight from the viewpoint of the current to be applied to the EC element, the optical density of the EC element, and the bleaching response.

FIG. 6 shows that when the proportion of cyanoethyl pullulan to the solvent is in the range of 20% by weight to less than 40% by weight, the temperature coefficient of the optical density was in the range of −0.2%/° C. to less than +0.2%/° C. This suggests that it is advantageous for suppressing current increase and self-bleaching reaction to control the temperature coefficient of optical density in the range of −0.2%/° C. to less than +0.2%/° C.

Thus, the electrochromic element according to an embodiment of the present disclosure can operate stably over a wider range of temperatures than previously possible.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-077423 filed Apr. 7, 2016, which is hereby incorporated by reference herein in its entirety.

What is claimed is:

1. An optical filter comprising:
an electrochromic element; and
an active element connected to the electrochromic element,
wherein the electrochromic element comprises:
a pair of electrodes; and
an electrochromic layer disposed between the pair of electrodes, the electrochromic layer containing an electrochromic material, a solvent, and a cyanoethylated polymer,
wherein the proportion of the cyanoethylated polymer to the solvent is 20% by weight to less than 40% by weight, and
wherein the optical density of the electrochromic layer has a temperature coefficient of $-0.2\%/°$ C. to less than $+0.2\%/°$ C. at a temperature from room temperature to $80°$ C.

2. The optical filter according to claim 1, wherein the active element drives the electrochromic element and controls the amount of light passing through the electrochromic element.

3. A lens unit comprising:
an imaging optical system including a plurality of lenses; and
an optical filter comprising an electrochromic element and an active element connected to the electrochromic element,
wherein the electrochromic element comprises:
a pair of electrodes; and
an electrochromic layer disposed between the pair of electrodes, the electrochromic layer containing an electrochromic material, a solvent, and a cyanoethylated polymer,
wherein the proportion of the cyanoethylated polymer to the solvent is 20% by weight to less than 40% by weight, and
wherein the optical density of the electrochromic layer has a temperature coefficient of $-0.2\%/°$ C. to less than $+0.2\%/°$ C. at a temperature from room temperature to $80°$ C.

4. An imaging device comprising:
an imaging optical system including a plurality of lenses;
an electrochromic element; and
an imaging element configured to receive light after passing through the electrochromic element,
wherein the electrochromic element comprises:
a pair of electrodes; and
an electrochromic layer disposed between the pair of electrodes, the electrochromic layer containing an electrochromic material, a solvent, and a cyanoethylated polymer,
wherein the proportion of the cyanoethylated polymer to the solvent is 20% by weight to less than 40% by weight, and
wherein the optical density of the electrochromic layer has a temperature coefficient of $-0.2\%/°$ C. to less than $+0.2\%/°$ C. at a temperature from room temperature to $80°$ C.

5. An imaging device to which a lens unit having an imaging optical system including a plurality of lenses is removably mounted, the imaging device comprising:
an electrochromic element; and
an imaging element configured to receive light after passing through the electrochromic element,
wherein the electrochromic element comprises:
a pair of electrodes; and
an electrochromic layer disposed between the pair of electrodes, the electrochromic layer containing an electrochromic material, a solvent, and a cyanoethylated polymer,
wherein the proportion of the cyanoethylated polymer to the solvent is 20% by weight to less than 40% by weight, and
wherein the optical density of the electrochromic layer has a temperature coefficient of $-0.2\%/°$ C. to less than $+0.2\%/°$ C. at a temperature from room temperature to $80°$ C.

6. A window component comprising:
a pair of transparent substrates;
an electrochromic element disposed between the pair of transparent substrates; and
an active element connected to the electrochromic element,
wherein the electrochromic element comprises:
a pair of electrodes; and
an electrochromic layer disposed between the pair of electrodes, the electrochromic layer containing an electrochromic material, a solvent, and a cyanoethylated polymer,
wherein the electrochromic element controls the amount of light passing through the pair of transparent substrates, and
wherein the proportion of the cyanoethylated polymer to the solvent is 20% by weight to less than 40% by weight, and
wherein the optical density of the electrochromic layer has a temperature coefficient of $-0.2\%/°$ C. to less than $+0.2\%/°$ C. at a temperature from room temperature to $80°$ C.

7. The window component according to claim 6, wherein the active element drives the electrochromic element and controls the amount of light passing through the electrochromic element.

8. An electrochromic element comprising:
a pair of electrodes; and
an electrochromic layer containing an electrochromic material,
wherein the optical density of the electrochromic layer has a temperature coefficient of $-0.2\%/°$ C. to less than $+0.2\%/°$ C. at a temperature from room temperature to $80°$ C.

9. The electrochromic element according to claim 8, wherein the solvent is a carbonate ester.

10. The electrochromic element according to claim 8,
wherein the electrochromic layer further contains a solvent and a cyanoethylated polymer, and
wherein the proportion of the cyanoethylated polymer to the solvent is 20% by weight to less than 40% by weight.

11. The electrochromic element according to claim 10, wherein the cyanoethylated polymer is selected from the group consisting of cyanoethyl polyvinyl alcohol, cyanoethyl pullulan, and cyanoethyl cellulose.

12. The optical filter according to claim 8, further comprising an active element connected to the electrochromic element, wherein the active element drives the electrochromic element and controls the amount of light passing through the electrochromic element.

13. An imaging device to which a lens unit having an imaging optical system including a plurality of lenses is removably mounted, the imaging device comprising:
   the electrochromic element according to claim 8; and
   an imaging element configured to receive light having passed through the electrochromic element.

14. A window component comprising:
   a pair of transparent substrates;
   an electrochromic element disposed between the pair of transparent substrates; and
   an active element connected to the electrochromic element according to claim 8.

* * * * *